United States Patent [19]

De Bruycker et al.

[11] Patent Number: 4,783,353

[45] Date of Patent: Nov. 8, 1988

[54] RECOVERABLE ARTICLE

[75] Inventors: Erwin De Bruycker, Linden; Henri Van Emelen, Kessel-lo; Robert Vanhentenrijk, Winksele - Herent, all of Belgium

[73] Assignee: Raychem Corporation, Menlo Park, Calif.

[21] Appl. No.: 43,794

[22] Filed: Apr. 29, 1987

[30] Foreign Application Priority Data

Apr. 29, 1986 [GB] United Kingdom ................ 8610486

[51] Int. Cl.⁴ ......................... H02G 15/18; B32B 3/10
[52] U.S. Cl. ............................ 428/34.9; 174/DIG. 8; 428/131; 428/223; 428/35.1
[58] Field of Search ............ 174/DIG. 8, 21 R, 22 R, 174/24; 24/121; 428/36, 131, 223

[56] References Cited

U.S. PATENT DOCUMENTS 0136138  4/1984  EPX  European Pat. Off. .
1585154  2/1981  GBX .
2112224  7/1983  GBX .
2135836  9/1984  GBX .

Primary Examiner—John E. Kittle
Assistant Examiner—James J. Seidleck
Attorney, Agent, or Firm—A. Stephen Zavell; Herbert G. Burkard

[57] ABSTRACT

A heat recoverable article comprises a fabric cover (2) which has an aperture (4) therein around the edges of which is clamped a rivet (2), fixed so as to prevent pull-out of the fabric fibres on recovery of the cover. The article is particularly suitable for use as a pressurized splice case since a valve can be passed through the aperture in the cover. The valve can be secured directly to the cover, or to a correspondingly apertured liner positioned within the cover.

6 Claims, 2 Drawing Sheets

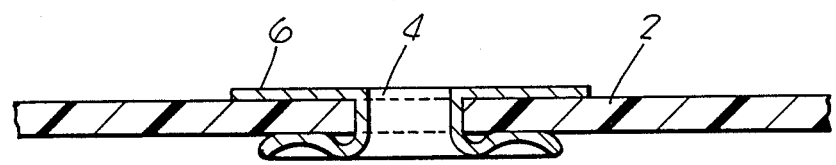
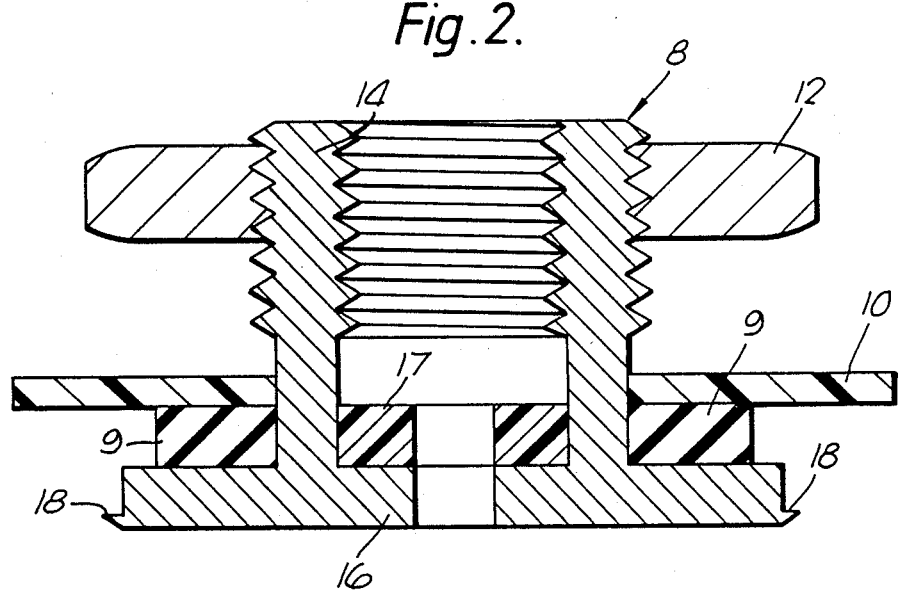

RECOVERABLE ARTICLE

FIELD OF THE INVENTION

This invention relates to recoverable articles which contain an aperture.

BACKGROUND OF THE INVENTION

Recoverable articles are known. They are used, for example to enclose a substrate for example a pipe or a cable, a pipe joint or a cable splice. Typically the article comprises a heat recoverable polymeric sleeve which is shrunk around the substrate to be enclosed by applying heat to the sleeves. For some applications, for example for a splice between telecommunications cables, it is usual to include a relatively rigid liner around the splice, beneath the sleeve, to protect the splice.

It is also known to incorporate a valve into the splice closure system. This may be used for a variety of purposes. For example newly installed telecommunication splice closures are typically tested for leakage by temporarily pressurising the splice by means of a valve. This is called "a flash-test". Also some telecommunications systems are permanently pressurised. In these cases the valve may provide access to a pressure monitoring device, which acts as a leakage detection device: a fall in the pressure reading indicating a leak in the system. British Patent Application No 17797/76 for example, describes a heat shrinkable polymeric sleeve wherein a valve is mounted in a stable part of the sleeve. British Patent Application No 8137818 describes an alternative construction in which the valve is mounted on the liner, and extends through a hole in the sleeve.

Heat recoverable articles which comprises a recoverable fabric are also known British Patent Application, Publication No. 8400188 for example describes a recoverable fabric sleeve used in conjunction with a liner as a cable splice case. In a preferred embodiment the liner carries a valve through which the splice may be pressurised. The valve is pushed between the fibres of the fabric sleeve to the exterior of the sleeve.

The present invention provides an alternative fabric cover which can be used, inter alia, as a sleeve to enclose a pressurised substrate. The cover itself contains an aperture in which a member adapted to receive a valve or plug can sit, to control the fluid flow through the cover. The invention also provides a new assembly for enclosing a substrate which comprises an apertured cover (fabric or polymeric for example), a liner and a member which locates the apertures of the liner and the cover.

SUMMARY OF THE INVENTION

A first aspect of the invention provides a cover suitable for enclosing a substrate, comprising:
a recoverable fabric which has a recovery ratio of at least 2:1 and which contains an aperture; and
a clamping member clamped around the edge of the aperture.

A second aspect of the invention provides an assembly for enclosing an elongate substrate, comprising;
(a) a liner containing an aperture;
(b) a cover which can be positioned around the liner, which also contains an aperture; and
(c) a tubular member which can pass through the aperture in the cover, which comprises a base portion adapted to cooperate with the aperture in the liner to locate the cover relative to the liner.

DETAILED DESCRIPTION OF THE DRAWINGS

Preferably the cover according to the second aspect of the invention comprises a recoverable fabric.

A recoverable fabric is a fabric which, as a whole, will recover, on heating (if it is heat recoverable) or other treatment, towards an original shape from which it has previously been deformed, or towards a new shape governed by the recovered configuration of the fibres it contains, or towards another new configuration from which the article as a whole has not been previously deformed.

The fabric will generally comprise a shrinkable (preferably heat-shrinkable) sleeve comprising preferably polymeric fibres exhibiting (in the final product at least) the property of elastic or plastic memory, which property is described, for example, in U.S. Pat. Nos. 2,027,962; 3,086,242 and 3,597,372. As is made clear in, for example, U.S. Pat. No. 2,027,962, an original dimensionally heat-stable form may be a transient form in a continuous process in which, for example, an extruded tube is expanded (or in the present case a fabric tube is expanded or fibres are stretched, generally during their formation) to a dimensionally heat unstable form in a separate stage.

In the production of polymeric heat-recoverable articles in general, the polymeric material may be cross-linked at any stage in the production of the article that will improve temperature stability which enhancing the desired dimensional recoverability. One manner of producing a heat-recoverable article comprises stretching or shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is heat-unstable, application of heat will cause the article to assume its original heat-stable shape.

Preferably the fabric comprises fibres which have been rendered heat recoverable by cross-linking by irradiation. Where this is the case, it is convenient to incorporate the cross-linking step into the overall manufacture of the fibre. The fibre can be extruded, stretched at a temperature below its melting temperature, preferably by an amount of from 500-2000%, then subjected to irradiation to effect cross-linking. A less preferred way of making the fibre is to extrude the material, irradiate to cross-link, then heat the fibre preferably to above its melting temperature, stretch the fibre, and then cool. HDPE fibres are preferably irradiated with a dose of from about 5 to about 35 megarads, more preferably from about 5 to about 25 megarads, and most preferably from about 7 to about 18 megarads, especially from 10 to above 18 megarads. The gel content that results is preferably at least 20%, more preferably at least 30% and most preferably at least 40%. In practice a maximum of about 90% will be sufficient for most purposes.

As an alternative the fabric may be heat recoverable by comprising elastomeric members held in a stretched state by a second member, which, upon heating weakens and thus allows the elastomeric members to recovery.

Recoverable fabric materials are disclosed in the following British patent applications, the disclosure of which are incorporated by reference: Nos. 2107216 2135836 2133740 2134334.

When recoverable by heat, the recovery temperature is preferably 60° C. or more, more preferably from 80°–250°.

The following discussion of preferred embodiments is directed to the case where the cover comprises a fabric (as in the first aspect of the invention, and in a preferred embodiment according to the second aspect of the invention.

The cover comprises a clamping member positioned around the aperture in the fabric. As an example, this may be in the form of a rivet. Preferably the aperture in the fabric intersects, at least some of the fibres of the fabric. This is desirable in order for the aperture to be sufficiently large for a member, preferably a valve base, to be inserted therethrough. Where the fibres of the fabric are intersected, the clamping member is preferably positioned to grip at least some, preferably all, of the intersected fibres. Where, as is the preferred case, the fibres are recoverable, the gripping force prevents "runaway" of the fibres, that is shrinkage of the fibres away from the aperture which could result in a weakening of the area of fabric surrounding the aperture. Preferably the clamping force exerted is sufficient to resist the recovery forces of the fibres.

In a preferred embodiment the cover may be used for enclosing a substrate. For this application the fabric cover is preferably in tubular form or wraparound form, and is radially shrinkable. This may conveniently be achieved using a tubular or wrapped fabric in which at least the fibres running around the circumference of the body are recoverable.

The type of fibres used in the fabric, and the construction of the fabric which may be used will now briefly be considered. It is envisaged that any weave or knit or non-woven agglomeration of any fibres may be used providing the required degree of recovery can be introduced. For the present purposes the term weave is to include braids, since the products are similar although the methods of production are different, the terms warp and weft are not strictly applicable to braids but when used herein with reference to weaves can be considered to relate also to braids by arbitrary selection of fibre directions. Recoverability is preferably provided by weaving or knitting fibres that are already recoverable, rather than by deforming a fabric woven or knitted from dimensionally stable fibres. In the first of these possibilities, the recovery ratio of the fabric will depend not only on the recovery ratio of its fibres, but also on the type of weave or knit.

In general, the fabric will be constructed so that the recoverable fibres can effectively run at least in the direction where recovery is required. In a weave, therefore, in order to achieve radial recovery of the tube, the warp only, or the weft ony, or both weft and warp, may be recoverable. In more complicated weaves, such as a triaxial weave, one or another of the warps may be recoverable. An advantage of the use of fabrics is that perfect uniaxial recovery, or a chosen split in recovery between two directions, may be achieved. Where the farbic is knitted, use of a recoverable fibre will produce recovery in all directions, although selective recovery can be provided by controlled warp or weft insertion.

Different effects, in terms of for example, final recovery ratio, strength and flexibility, will result from different types of weave or knit even if the same fingers are used. Examples of type of weave include plain, twill, broken twill, herring bone, satin, sateen, leno, hop sac, sack, matt and combinations of these. The weave may be single ply, or if higher density or thicker fabrics are desired multiple ply weaves may be used.

B128

The fibres used to produce the recoverable fabric may be monofilaments, multifilaments or spun staple yarns. Greater flexibility can be attained using multifilament yarns, although problems can be encountered in cross-linking due to the high surface area. Examples of polymeric material that may be used include polyolefins such as polyethylene (especially HDPE) and polypropylene, polyamides, polyesters, polyethertherketons, polyaryletherketones, nylons and fluoropolymers such as FEP, ethylene perfluoro copolymer, polyvinylidine fluoride and TFE copolymers. The recovery temperature, by which we mean the temperature at which recovery will go substantially to completion, is preferably 60° C. or more, more preferably from 80°–250° C. most preferably from 120°–150° C. Preferred recoverable fibres have a glass transition temperature Tg of at least 140° C.

A non-recoverable fibre may be used as a reinforcement or supplement to the recoverable fibres, or may constitute the major component in one or more dimensions of the fabric. The following non-recoverable materials may be regarded as illustrative: glass fibres, carbon fibres, wires or other metal fibres, polyesters, aromatic polymers such as aromatic polyamides for example Kevlar (trade name), imides and ceramics. The non-recoverable component may be permanent, giving the recovered article enhanced strength etc., or may be present in discrete form only to locate the recoverable component during installation.

A preferred fabric for use in the present invention comprises a tubular weave having a weft of recoverable fibres preferably high density polyethylene fibres, and a warp of heat-stable (not recoverable) fibres, preferably glass fibres.

For some applications it is desirable that the fabric is impervious. The extent to which the fabric need be impervious depends on the use of the assembly. Where the assembly is used to seal a splice between pressurized cables a high imperviousness will be desirable if energy and pressurization medium are not to be wasted. In other situations imperviousness to water, oil, fuel or hydraulic fluids may be required. A degree of perviousness will, in general, be tolerable depending on the nature of the substrate and on the length of time that the assembly will be in use.

The means for rendering the fabric substantially impervious may, for example, be a polymeric material used in conjunction with, bonded to, or extending throughout the recoverable fabric, it may be a liner where the liner is of substantially sheet form rather than, say, a cage, or it may be some means whereby the nature of the fabric is altered. A recoverable fabric rendered impervious can have excellent pressure reintention where imperviousness to air is required. This is described in British Patent Application Publication No. 8400188.

The fabric cover according to the first aspect of the invention is preferably provided as part of an assembly, which additonally comprises a tubular member. At least part of the tubular member is adapted to pass through the aperture in the fabric. The tubular member is adapted, for example internally screw threaded, so that a valve or plug can be attached to it to control the passage of fluid through the cover. This finds particular application where the cover is to be used as a pressurised splice case. The tubular member preferably comprises a first portion which can pass through the aperture and a second portion which acts as a stop against a surface of the cover: in the preferred embodiment where the cover is used to enclose a substrate, the member stops against the inner surface of the cover. In a particularly preferred embodiment the first portion of the tubular member is generally cylindrical and the second portion is the form of an apertured circular disc, which extends beyond the base of the cylinder. The aperture in the disc may be the same size as the internal aperture of the cylinder, but is preferably smaller. The assembly preferably includes another member, for example a nut, which can be secured to the tubular member and which acts as a stop against the outer surface of the cover. In a preferred embodiment the nut is internally threaded and cooperates with an externally threaded tubular member. Thus the nut in conjunction with the base of the tubular member sandwich the cover between them, and hence secure the tubular member to the cover.

The tubular member may also contain a sealing member, for example a sealing ring, to seal to the inserted valve or plug. Alternatively the valve or plug may itself carry a sealing ring. A metal shielding member, which is preferably annular may be included positioned between the nut and the cover. When a torch is used to shrink the cover this shields the fabric around the aperture from the flame.

Preferably the assembly is such that when all the parts are installed on the cover, it is substantially flush with the surface of the cover. In the preferred assembly described above, the nut thickness is the only projection above the cover surface. The nut thickness is preferably at most 5 more preferably at most 3 mm.

Preferably the assembly also includes a liner which contains an aperture. Preferably the second portion of the tubular member and the liner-aperture are arranged to cooperate, or more preferably interlock. The liner preferably comprises a plurality of flexible fingers which engage the second portion of the tubular member. Preferably the liner is planar in the region of the aperture. This has the advantage that when the tubular member is inserted into the aperture all the flexible fingers are loaded simultaneously. Preferably the fingers bend away from the plane of the liner.

In one preferred embodiment the tubular member and attached valve or plug or simply a valve or plug per se are secured directly to the liner rather than being attached to the cover, i.e. rather than being positioned to sandwich the cover therebetween.

The assembly according to the second aspect of the invention also provides an apertured liner and cover and a tubular member cooperating the two. In the assembly according to the second aspect of the invention the cover need not be fabric, for example it may comprise any recoverable polymeric sheet material.

The cooperation of the apertures in the liner and the cover has a number of advantages. First it provides a passage from the outside of the cover to the inside of the liner through which fluid can pass; secondly, when the cover and liner are used around a cable it can provide electrical access to the cable shielding; and thirdly, where the liner and cover are interlocked together, when a valve or plug or other appendage are screwed into the tubular member, the torque applied is transmitted at least in part to the relatively rigid liner away from the more vulnerable sleeve;

BRIEF DESCRIPTION OF THE DRAWINGS

An embodiment of the invention will now be described, by way of examples, with reference to the accompanying drawings, wherein;

FIG. 1 is a cross-sectional view showing an apertured cover according to the invention;

FIG. 2 is a cross-sectional view shows a tubular assembly which can be inserted in the aperture of the cover of FIG. 1, to which a valve or plug can be attached;

DETAILED DESCRIPTION OF THE DRAWINGS

Figure 3:
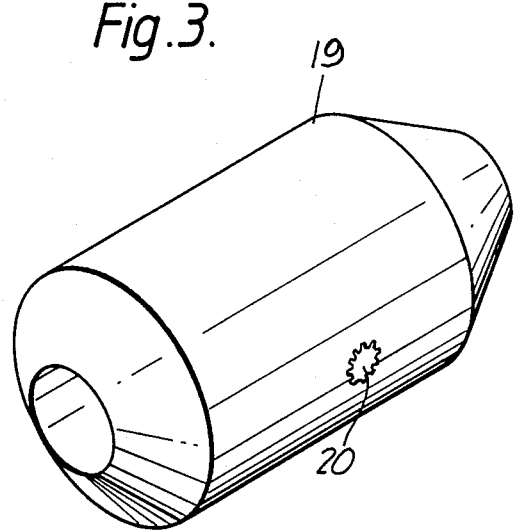
FIG. 3 is a schemative view showing a liner suitable for use in the invention.

Referring to the drawings, FIG. 1 shows an impervious recoverable fabric cover 2 containing an aperture 4. The cover comprises recoverable high density polyethylene fibres, embedded in a polymeric matrix. A rivet 6 is clamped around the edge of the aperture 4.

FIG. 2 shows a tubular assembly which can be fitted in the aperture 4. It comprises a tubular member 8, a rubber sealing ring 9, an adhesive coated ethylene vinylacetate disc 10, and a nut 12. The tubular member 8 comprises a first cylindrical portion 14 and a disc portion 16. The cylindrical portion 14 is both internally and externally screw threaded. The disc portion 16 is circumferentially ribbed at 18. The tubular member 8 contains an annular sealing ring 17 which sits on the circular disc 16 within the cylindrical portion 14. The nut 12 is internally threaded and engages the cylindrical portion 14. A plug or valve (not shown) may be screwed into the cylindrical portion 14. It seals against the sealing ring 17.

FIG. 3 shows a liner 19 having an aperture therein, the aperture is castellated to provide a number of flexible fingers 20. The aperture may be stamped out of the liner. The liner may be tubular (as shown) or wraparound. To engage the liner and the cover, the disc 16 of the tubular assembly is pushed through the flexible fingers 20 into the liner. The rib 18 on the disc 16 engages the fingers 20. Thus there is a push fit.

In a typical application as an enclosure for a cable splice, first the splice is made, then the liner installed, then the cover positioned and located relative to the liner using the tubular assembly, then the cover recovered. The splice may then be temporarily pressurised via a valve screwed into the tubular member 8 in order to "flash-test" the closure.

Figure 4:
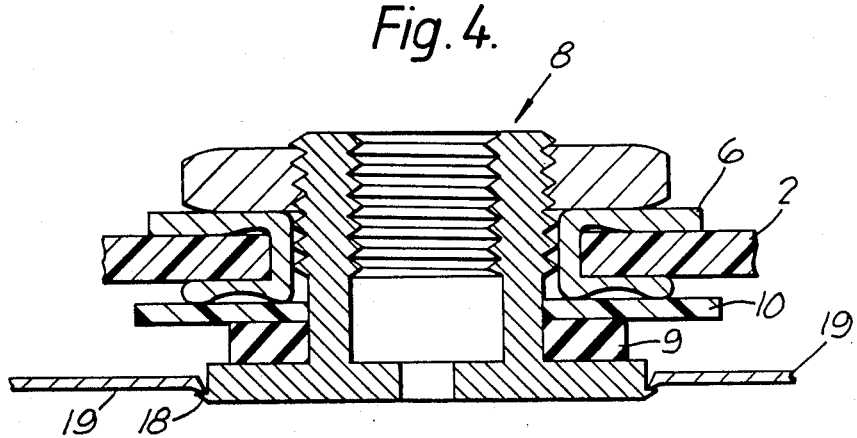
FIG. 4 is a cross-sectional view showing the tubular asssembly of FIG. 2 installed on the cover of FIG. 1, and on the liner of FIG. 3.

FIG. 4 shows the tubular assembly of FIG. 3 installed in the cover 2 of FIG. 1 and an the liner of FIG. 3. The adhesive coated disc 10 and rubber ring 9 seal any gap between the edges of the aperture in the fabric 2 and the tubular member 8, The nut is screwed firmly into the cover to secure the seal. The flexible fingers 20 of the liner and the rib 18 of the disc 16 on the tubular member 8 engage each other in a push fit.

We claim:

1. A cover suitable for enclosing a substrate, comprising:

(i) a recoverable fabric which has a recovery ratio of at least 2:1 and which contains an aperture; and (ii) a clamping member comprising a rivet which is to be secured around the edge of the aperture to prevent pull-out of the fabric fibers on recovery of the fabric.

2. A cover according to claim 1, further comprising:

(iii) means for rendering the fabric substantially impervious when the fabric is recovered.

3. A cover according to claim 2, wherein the means for rendering comprises a polymeric material adhered to at least one surface of the fabric, or a polymeric matrix through which the fabric extends.

4. An assembly which comprises:

(A) a cover in the form of a sleeve and suitable for enclosing a substrate comprising:

(i) a recoverable fabric which has a recovery ratio of at least 2:1 and which contains an aperture; and (ii) a clamping member comprising a rivet which is to be secured around the edge of the aperture to prevent pull-out of the fabric fibers on recovery of the fabric; and (B) a liner having an aperture therein which can be aligned with the aperture in the recoverable fabric to allow passage of fluid from the inside of the liner to the outside of the cover.

5. An assembly according to claim 4, further comprising:

(C) a tubular member at least part of which can pass through the aperture in the recoverable fabric, and to which a valve or plug can be attached to control the passage of fluid through the cover.

6. An assembly according to claim 5, wherein the tubular member comprises: a first portion which can pass through the aperture in the recoverable fabric; and a second portion which acts as a stop against an inside of the cover and which is arranged to cooperate with the liner.

* * * * *

UNITED STATES PATENT AND TRADEMARK OFFICE
CERTIFICATE OF CORRECTION

PATENT NO. : 4,783,353

DATED : November 8, 1988

INVENTOR(S) : De Bruycker et al

It is certified that error appears in the above-identified patent and that said Letters Patent is hereby corrected as shown below:

Column 4, line 7, please delete "B128".

Signed and Sealed this

Eighth Day of September, 1992

Attest:

DOUGLAS B. COMER

Attesting Officer

Acting Commissioner of Patents and Trademarks